_(12)_ United States Patent
Culver

(10) Patent No.: US 9,228,565 B1
(45) Date of Patent: Jan. 5, 2016

(54) WIND-PROPELLED GENERATOR

(71) Applicant: Mary K. Culver, Towson, MD (US)

(72) Inventor: Mary K. Culver, Towson, MD (US)

( * ) Notice: Subject to any disclaimer, the term of this patent is extended or adjusted under 35 U.S.C. 154(b) by 0 days.

(21) Appl. No.: 14/680,128

(22) Filed: Apr. 7, 2015

(51) Int. Cl.
*F03D 9/00* (2006.01)
*F03D 3/00* (2006.01)
*F03D 11/04* (2006.01)

(52) U.S. Cl.
CPC .............. *F03D 3/005* (2013.01); *F03D 9/002* (2013.01); *F03D 11/04* (2013.01); *F05B 2240/9112* (2013.01)

(58) Field of Classification Search
CPC ......... F03D 3/005; F03D 9/002; F03D 11/04; F05B 2240/9112
USPC .................. 52/173.1; 248/693, 675, 201, 237
See application file for complete search history.

(56) References Cited

U.S. PATENT DOCUMENTS

| 3,876,925 | A | * | 4/1975 | Stoeckert | B60K 16/00 180/2.2 |
| D252,572 | S | | 8/1979 | Hanson | |
| 4,364,709 | A | * | 12/1982 | Tornquist | F03D 3/061 416/132 B |
| 4,379,972 | A | * | 4/1983 | Sosa | F03D 9/007 290/44 |
| 4,608,792 | A | * | 9/1986 | Gerber | E04D 13/17 454/240 |
| 6,872,054 | B2 | * | 3/2005 | Pearce | F04D 29/601 248/342 |
| 7,518,255 | B2 | | 4/2009 | Gordon | |
| 7,578,493 | B2 | * | 8/2009 | Lovell | H04N 7/18 248/324 |
| 7,839,010 | B2 | * | 11/2010 | Harvey | F03D 9/00 290/55 |
| 8,102,073 | B2 | * | 1/2012 | Morrison | F03D 9/002 290/44 |
| 8,196,359 | B1 | * | 6/2012 | Jiang | F03D 11/04 416/DIG. 6 |
| 8,283,799 | B1 | * | 10/2012 | Thorpe | F03D 3/065 290/55 |
| 8,368,240 | B1 | * | 2/2013 | Burkett | F03D 9/00 290/44 |
| 8,513,828 | B1 | * | 8/2013 | Ripley | B60L 8/006 180/2.2 |
| 8,772,959 | B2 | * | 7/2014 | Lee | F03D 9/002 290/44 |
| 8,779,618 | B2 | * | 7/2014 | Morrison | F03D 9/002 290/44 |
| 2007/0210585 | A1 | * | 9/2007 | Korner | F03D 3/005 290/55 |
| 2008/0191489 | A1 | * | 8/2008 | Harvey | F03D 9/00 290/55 |
| 2008/0265584 | A1 | * | 10/2008 | Teng | F03D 9/00 290/55 |
| 2009/0256360 | A1 | | 10/2009 | Candelas Perez | |
| 2010/0126086 | A1 | | 5/2010 | Paggi | |
| 2010/0171315 | A1 | * | 7/2010 | Flood | F03B 17/062 290/55 |
| 2011/0089698 | A1 | * | 4/2011 | Ahmadi | F03D 9/007 290/55 |
| 2011/0140443 | A1 | * | 6/2011 | Morrison | F03D 9/002 290/55 |
| 2011/0215579 | A1 | | 9/2011 | Barzilai | |
| 2012/0112465 | A1 | * | 5/2012 | Morrison | F03D 9/002 290/55 |
| 2013/0026334 | A1 | * | 1/2013 | Long | F04D 25/08 248/675 |
| 2013/0048819 | A1 | * | 2/2013 | Hung | F16M 11/12 248/286.1 |
| 2013/0049373 | A1 | * | 2/2013 | Lee | F03D 9/002 290/55 |
| 2015/0013229 | A1 | * | 1/2015 | Shalom | E05F 15/668 49/199 |

FOREIGN PATENT DOCUMENTS

DE 29606703 U1 * 6/1996 ............... B60L 8/00

* cited by examiner

*Primary Examiner* — Brent W Herring

(57) ABSTRACT

The wind propelled generator is an electrical generator uniquely adapted for installation and use with a pitched roof of a house. The electrical generator includes a housing that is suspended from a bottom surface of the sub-surface of the pitched roof. A hole is included to enable the rotor of said electrical generator to extend vertically there through and from which the wind vanes are positioned above the pitched roof surface whereby outdoor wind is able to actuate and rotate said wind vanes thereby producing electrical power.

6 Claims, 2 Drawing Sheets

WIND-PROPELLED GENERATOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of electrical generators, more specifically, an electrical generator that is specially adapted for use on a pitched roof of a house.

B. Discussion of the Prior Art

As will be discussed immediately below, no prior art discloses an electrical generator that is uniquely adapted for installation and use with a pitched roof of a house; wherein the electrical generator includes a housing that is designed to be installed and suspended from a bottom surface of the sub-surface of the pitched roof and whereby a hole is included to enable the rotor of said electrical generator to extend vertically there through and from which the wind vanes are positioned above the pitched roof surface whereby outdoor wind is able to actuate and rotate said wind vanes thereby producing electrical power, which is transmitted to a breaker panel of the respective house; wherein the housing of the electrical generator includes a pair of vertically-oriented tracks integrated on a first side surface of the housing, and upon which a slideable bracket is engaged thereon; wherein the slideable bracket includes a first hinged member; wherein the housing includes a non-slideable bracket that is hingedly affixed to a second hinged member; wherein the non-slideable bracket is located a second side surface of the housing; wherein the first hinged member works in concert with the second hinged bracket secure to the bottom surface of the sub-surface of the pitched roof; wherein the first hinged bracket and the second hinged bracket insure that the housing, rotor, and wind vanes are vertically oriented with respect to the ground.

The Barzilai Patent Application Publication (U.S. Pub. No. 2011/0215579) discloses an air and direct power generator device attached to the air stream of a fan or directly to a shaft of a fan which could be on a roof of a building. However, the generator does not utilize natural wind, and requires the use of an existing exhaust fan or other wind generating device. Additionally, the generator does not include a hinge system to mount the generator inside the structure.

The Paggi Patent Application Publication (U.S. Pub. No. 2010/0126086) discloses an electric wind generator for the roof ridge of a building. However, the generator is designed to be used only with a gabled roof, and also the fan is mounted within an enclosure. Additionally, the generator can only be placed on a roof ridge.

The Gordon Patent (U.S. Pat. No. 7,518,255) discloses a roof mounted wind turbine. However, the generator does not include a vertically mounted fan blade to utilize the wind power coming from any direction, and includes an enclosed cowl surrounding the turbine blades. Additionally, the generator does not does not include a hinge system to mount the generator inside the structure.

The Flood Patent Application Publication (U.S. Pub. No. 2010/0171315) discloses a roof mounted wind turbine for generating electricity. However, the generator uses a wind scoop to catch wind, and does not include a external fan blade or turbine system to utilize wind power.

The Candelas Perez et al. Patent Application (U.S. Pub. No. 2009/0256360) discloses a wind turbine which mounts on the roof of a building. However, the generator utilizes an exterior housing used to contain all components of the generator, and also does not include an external, vertically mounted fan blade system to utilize the wind power coming from any direction. Additionally, the generator does not does not include a hinge system to mount the generator inside the structure.

The Hanson patent (U.S. Pat. No. Des. 252,572) illustrates an ornamental design for a wind turbine. However, the generator utilizes a cylindrical, vertical mount with a horizontally mounted turbine, and also does not does not include a hinge system to mount the generator inside the structure.

While the above-described devices fulfill their respective and particular objects and requirements, they do not describe an electrical generator that is uniquely adapted for installation and use with a pitched roof of a house; wherein the electrical generator includes a housing that is designed to be installed and suspended from a bottom surface of the sub-surface of the pitched roof and whereby a hole is included to enable the rotor of said electrical generator to extend vertically there through and from which the wind vanes are positioned above the pitched roof surface whereby outdoor wind is able to actuate and rotate said wind vanes thereby producing electrical power, which is transmitted to a breaker panel of the respective house; wherein the housing of the electrical generator includes a pair of vertically-oriented tracks integrated on a first side surface of the housing, and upon which a slideable bracket is engaged thereon; wherein the slideable bracket includes a first hinged member; wherein the housing includes a non-slideable bracket that is hingedly affixed to a second hinged member; wherein the non-slideable bracket is located a second side surface of the housing; wherein the first hinged member works in concert with the second hinged bracket secure to the bottom surface of the sub-surface of the pitched roof; wherein the first hinged bracket and the second hinged bracket insure that the housing, rotor, and wind vanes are vertically oriented with respect to the ground. In this regard, the wind propelled generator departs from the conventional concepts and designs of the prior art.

SUMMARY OF THE INVENTION

The wind propelled generator is an electrical generator uniquely adapted for installation and use with a pitched roof of a house. The electrical generator includes a housing that is suspended from a bottom surface of the sub-surface of the pitched roof. A hole is included to enable the rotor of said electrical generator to extend vertically there through and from which the wind vanes are positioned above the pitched roof surface whereby outdoor wind is able to actuate and rotate said wind vanes thereby producing electrical power. The housing of the electrical generator includes a pair of vertically-oriented tracks integrated on a first side surface of the housing, and upon which a slideable bracket is engaged thereon. The slideable bracket includes a first hinged member; wherein the housing includes a non-slideable bracket that is hingedly affixed to a second hinged member. The non-slideable bracket is located a second side surface of the housing; wherein the first hinged member works in concert with the second hinged bracket secure to the bottom surface of the sub-surface of the pitched roof. The first hinged bracket and the second hinged bracket insure that the housing, rotor, and wind vanes are vertically oriented with respect to the ground.

An object of the invention is to provide an electrical generator that uses wind energy to produce electricity via a generator housed inside of a housing, which is suspended beneath a bottom surface of a sub-surface of a pitched roof.

A further object of the invention is to provide a housing that is adaptively installed via hinged members, which insures that the housing and rotor shall be vertically oriented when installed, and regardless of the degree of pitch of the respective roof.

A further object of the invention is to include a housing that includes a rotor and wind vanes that extend upwardly and through a roof thereby minimizing the amount of componentry that is exposed to the outdoor environment.

A further object of the invention is to include a cover that is installed above the pitched roof in order to maintain the integrity of the roof despite the hole made to accommodate the rotor of the electrical generator.

These together with additional objects, features and advantages of the wind propelled generator will be readily apparent to those of ordinary skill in the art upon reading the following detailed description of presently preferred, but nonetheless illustrative, embodiments of the wind propelled generator when taken in conjunction with the accompanying drawings.

In this respect, before explaining the current embodiments of the wind propelled generator in detail, it is to be understood that the wind propelled generator is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wind propelled generator.

It is therefore important that the claims be regarded as including such equivalent construction insofar as they do not depart from the spirit and scope of the wind propelled generator. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
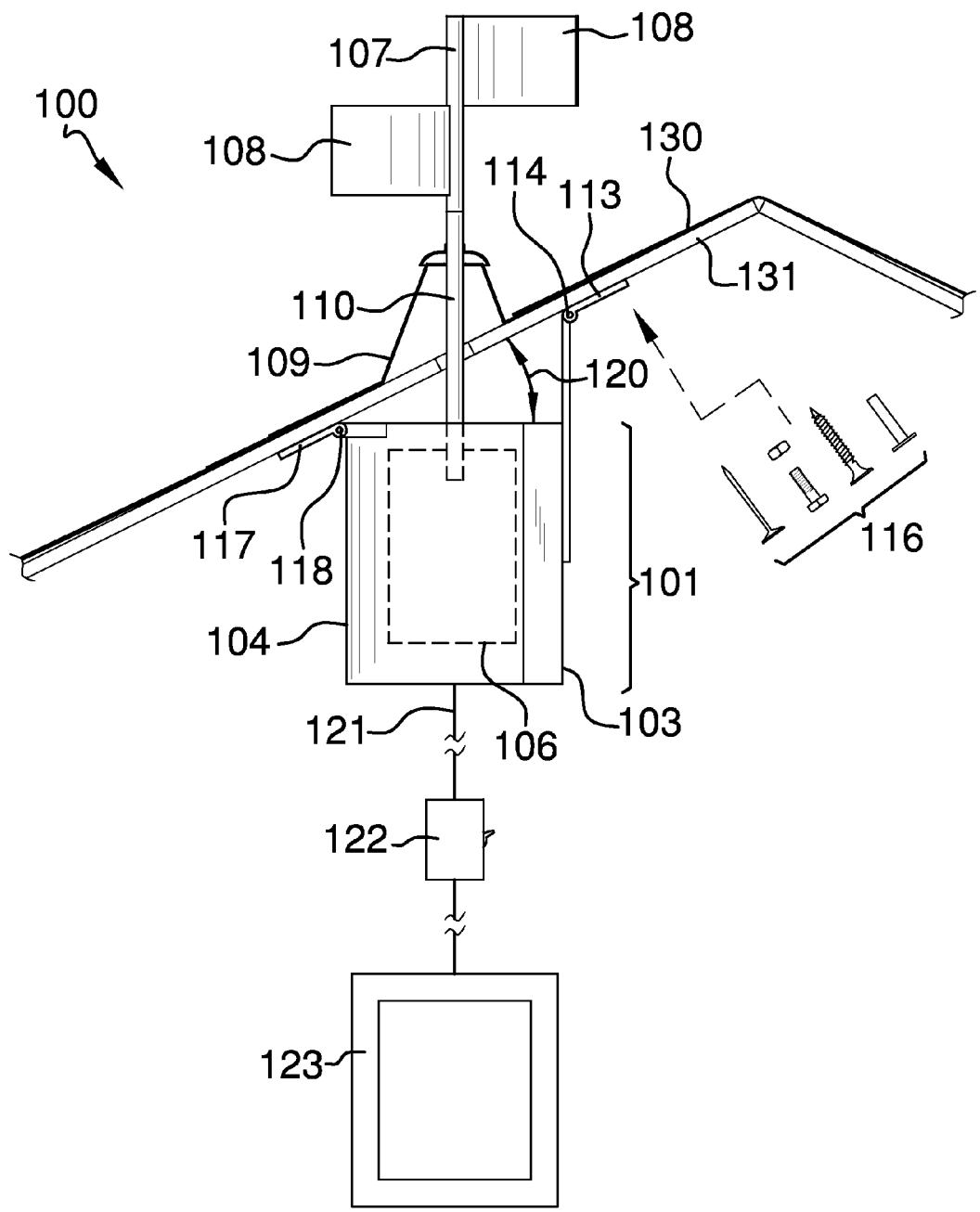
FIG. 1 illustrates a side view of the wind propelled generator installed under a pitched roof and depicting wiring extending to a breaker panel.
Figure 2:
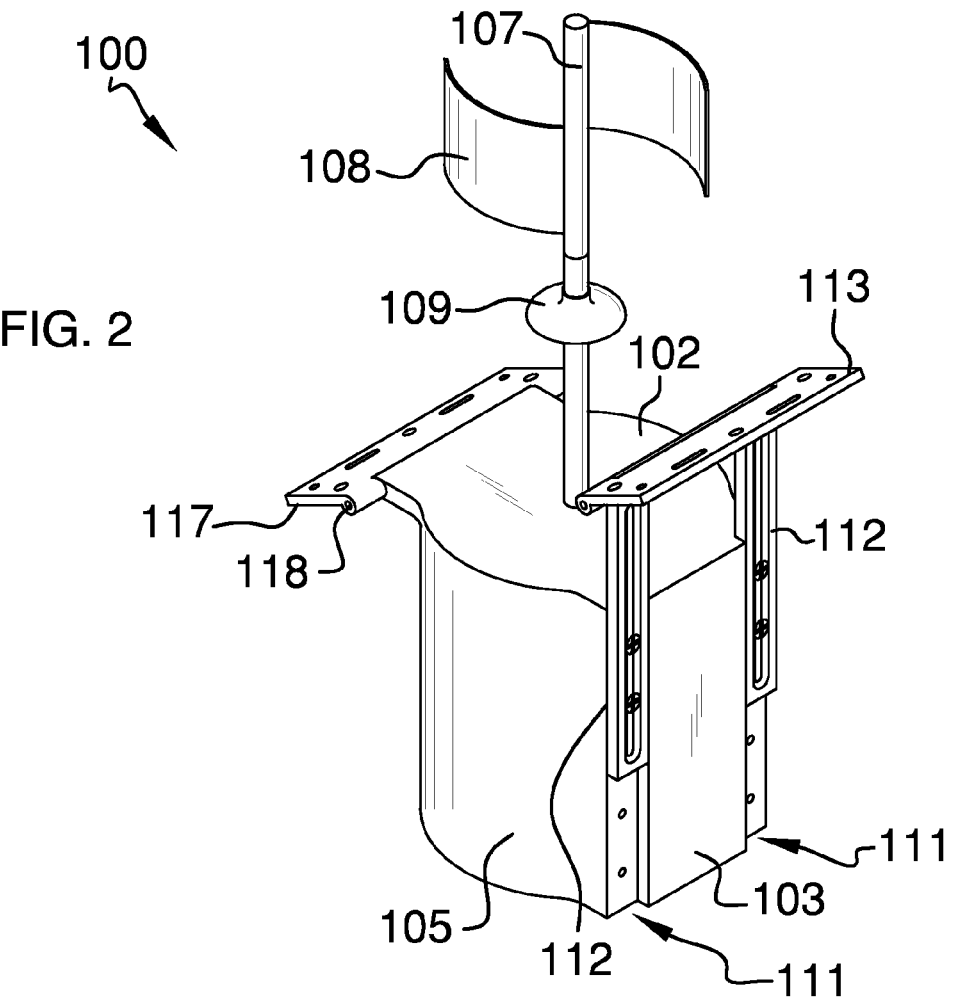
FIG. 2 illustrates a perspective view of the wind propelled generator by itself.
Figure 3:
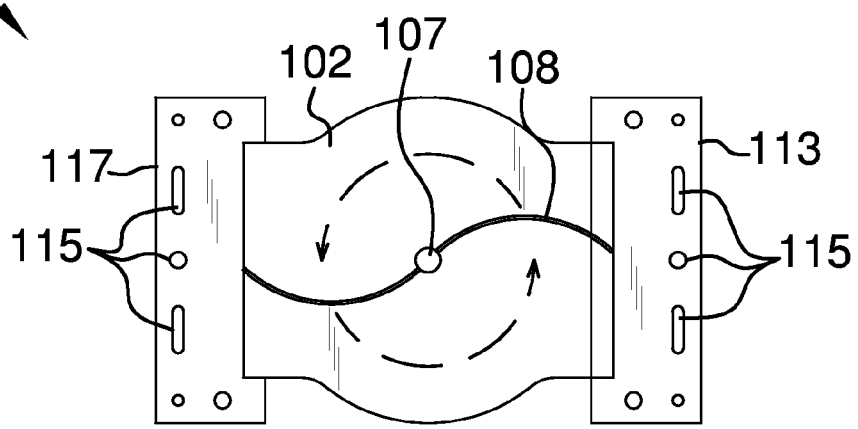
FIG. 3 illustrates a top view of the wind propelled generator wherein rotational arrows indicate rotational movement of the wind vanes thereon.

Detailed reference will now be made to the preferred embodiment of the present invention, examples of which are illustrated in FIGS. 1-3. A wind propelled generator 100 (hereinafter invention) includes a housing 101 that is further defined as including a top surface 102, a first side surface 103, a second side surface 104, and curved side surfaces 105.

The housing 101 includes a generator 106 within, and a rotor 107 extends upwardly through the top surface 102 where at least two wind vanes 108 are provided. The rotor 107 is of an undefined length, and is designed to extend through a pitched roof surface 130. Moreover, the rotor 107 may include a cover 109 that is custom fitted to the rotor 107, and which is designed to extend above the pitched roof surface 130 in order to maintain a waterproof surface. The rotor 107 is further defined with a first rotor member 110 that is non-rotating, and which works with the cover 109 to support the invention 100 in place with respect to the pitched roof surface 130. Moreover, the rotor 107 extends upwardly from the cover 109 and the first rotor member 110, and is able to rotate along with the wind vanes 108.

The wind vanes 108 and the rotor 107 are able to rotate either clockwise or counterclockwise in order to generate electricity via the generator 106 located in said housing 101. The housing 101 is uniquely adapted to secure and hang from a bottom surface 131 of the pitched roof surface 130. Moreover, the housing 101 includes a pair of vertically-oriented tracks 111, which are integrated into the first side surface 103.

Slideable brackets 112 affix to the vertically-oriented tracks 111 such that the slideable brackets 112 are able to adjust up or down as needed. The slideable brackets 112 are attached to a first hinged member 113, which is able to rotate about a first pivot point 114. The first hinged member 113 has a rectangular surface area upon which a series of mounting holes 115 are provided, and used to secure the first hinged member 113 to the bottom surface 131 of the pitched roof surface 130. Moreover, fastening members 116 are included and used to secure the invention 100 to the bottom surface 131, and comprise the use of nails, screws, bolts and nuts, or rivets.

The housing 101 also includes a second hinged member 117 that attaches to and rotates about a second pivot point 118. The second hinged member 117 is located at the edge whereby the second side surface 104 meets the top surface 102. Thus, the second hinged member 117 is located on an opposing side of the housing 101 relative the first hinged member 113.

The use of the first hinged member 113 with the second hinged member 117 enables the housing 101 to be secured to and hung underneath the bottom surface 131 of the pitched roof surface 130. More importantly, the first hinged member 113 and the second hinged member 117 enable the top surface 102 of the housing 101 to be installed at a horizontal orientation whereby the pitched roof surface 130 forms an acute angle 120 there between.

The generator 106 includes a wire 121 that extends to a power switch 122 located elsewhere, and which directs the flow of electricity produced via the invention 100 to a breaker box 123. It shall be noted that the electricity produced via the invention 100 can be supplied to anything, and is not limited to a specific use or to the electrical system of the respective structure. Also, it shall be noted that the invention 100 may be used in multiples in order to produce more electricity.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A wind propelled generator comprising:
    a housing within which a generator is located and from which a rotor extends upwardly through a top surface of said housing;
    wherein wind vanes attach to the rotor and are capable of rotational movement when wind pushes there against, and from which said rotational movement is transmitted to said generator thereby producing electricity;
    wherein the housing is adapted for securement and is able to be hung from a bottom surface of a pitched roof surface
    the housing including a first side surface, a second side surface, and curved side surfaces; wherein a pair of vertically-oriented tracks are integrated into the first side surface, slideable brackets affixed to the vertically-oriented tracks such that the slideable brackets are able to adjust up or down relative to the tracks as needed, wherein the slideable brackets are attached to a first hinged member which is able to rotate about a first pivot point;
    the rotor comprising a cover that is custom fitted to the rotor, the cover designed to extend above the pitched roof surface in order to maintain a waterproof surface, the rotor further comprising a first rotor member that is non-rotating and which works with the cover to support the housing in place with respect to the pitched roof surface.

2. The wind propelled generator as described in claim 1 wherein the first hinged member has a rectangular surface area upon which a series of mounting holes are provided, and used to secure the first hinged member to the bottom surface of the pitched roof surface.

3. The wind propelled generator as described in claim 2 wherein fastening members are included and used to secure the first hinged member to the bottom surface, and comprise the use of nails, screws, bolts and nuts, or rivets.

4. The wind propelled generator as described in claim 3 wherein the housing also includes a second hinged member that attaches to and rotates about a second pivot point.

5. The wind propelled generator as described in claim 4 wherein the second hinged member is located at the edge whereby the second side surface meets the top surface; wherein the second hinged member is located on an opposing side of the housing relative the first hinged member.

6. The wind propelled generator as described in claim 5 wherein the first hinged member and the second hinged member enable the top surface of the housing to be installed at a horizontal orientation whereby the pitched roof surface forms an acute angle there between.

* * * * *